United States Patent [19]

Engle

[11] Patent Number: 5,061,414
[45] Date of Patent: Oct. 29, 1991

[54] METHOD OF MAKING CARBON-CARBON COMPOSITES

[76] Inventor: Glen B. Engle, 16716 Martincoit Rd., Poway, Calif. 92064

[21] Appl. No.: 402,453

[22] Filed: Sep. 5, 1989

[51] Int. Cl.$^5$ .................. B29C 43/18; C01B 31/04
[52] U.S. Cl. .................. 264/29.5; 29/527.2; 264/29.7; 264/81; 264/105; 264/137; 264/162; 264/294; 423/447.4; 423/447.8; 423/448; 423/449; 427/203; 427/227; 427/228; 427/249
[58] Field of Search .................. 264/29.1, 29.5, 29.7, 264/81, 103, 105, 137, 162, 257, 294, 129, 134, 136, 258; 423/447.4, 447.8, 448, 449; 427/203, 227, 228, 249; 156/148, 155, 242, 245, 89; 29/418, 419.1, 458, 460, 527.1, 527.2

[56] References Cited

U.S. PATENT DOCUMENTS

| | | | |
|---|---|---|---|
| 3,895,084 | 7/1975 | Bauer | 264/29.1 X |
| 3,914,395 | 10/1975 | Finelli et al. | 423/448 |
| 4,131,708 | 12/1978 | Moores et al. | 427/228 X |
| 4,178,413 | 12/1979 | DeMunda | 264/29.5 X |
| 4,201,611 | 5/1980 | Stover | 156/155 |
| 4,318,955 | 3/1982 | Kulakov et al. | 264/29.5 X |
| 4,400,421 | 8/1983 | Stover | 428/113 |
| 4,466,013 | 8/1988 | Warren | 427/228 |
| 4,515,847 | 5/1985 | Taverna et al. | 264/29.5 X |
| 4,522,883 | 6/1985 | Wallace et al. | 423/447.4 X |
| 4,554,024 | 11/1985 | Zimmer et al. | 427/227 X |

OTHER PUBLICATIONS

L. Rubin, "High Modulus Carbon Fiber Based C/C for Space Applications", Jul. 18, 1986.
Rog E. Booth, "Thermal, Mechanical and Physical Properties of C/C Composites Containing P-100 Pitch--Based Fibers", 18-20 Jan., 1989.

*Primary Examiner*—Leo B. Tentoni
*Attorney, Agent, or Firm*—John R. Ross

[57] ABSTRACT

A process for making a carbon-carbon composite having a combination of high crystallinity, high strength, high modulus and high thermal and electrical conductivity. High-modulus/high-strength mesophase derived carbon fibers are woven into a suitable cloth. Layers of this easily graphitizable woven cloth are covered with petroleum or coal tar pitch and pressed at a temperature a few degrees above the softening point of the pitch to form a green laminated composite. The green composite is restrained in a suitable fixture and heated slowly to carbonize the pitch binder. The carbonized composite is then impregnated several times with pitch by covering the composite with hot pitch under pressure. The composites are given a heat treatment between each impregnation step to crack up the infiltrated carbon and allow additional pitch to enter the microstructure during the next impregnation cycle. The impregnated composites are then given a final heat treatment in the range 2500° to 3000° C. to fully graphitize the fibers and the matrix carbon. The composites are then infiltrated with pyrolytic carbon by chemical vapor deposition in the range 1000° to 1300° C. at a reduced pressure for approximately one hundred and fifty (150) hours.

15 Claims, No Drawings

METHOD OF MAKING CARBON-CARBON COMPOSITES

This invention was made with Government support under various contracts awarded through the Department of Energy. The Government has certain rights in this invention.

BACKGROUND OF THE INVENTION

This invention relates to carbon-carbon composites and in particular to highly graphitic and high-strength, high-modulus and high thermal and electrical conducting carbon-carbon composites.

Carbon-carbon composites are available which have many advantages over other materials. Conventional carbon-carbons are nongraphitic and relatively strong. However, these characteristics restrict their use in a variety of applications where a combination of high crystallinity, high strength, high modulus and high thermal and electrical conductivity is required.

SUMMARY OF THE INVENTION

The present invention provides a process for making a carbon-carbon composite having a combination of high crystallinity, high strength, high modulus and high thermal and electrical conductivity. High-modulus/-high-strength mesophase derived carbon fibers are woven into a suitable cloth. Layers of this easily graphitizible woven cloth are covered with petroleum or coal tar pitch and pressed at a temperature a few degrees above the softening point of the pitch to form a green laminated composite the green composite is restrained in a suitable fixture and heated slowly to carbonize the pitch binder. The carbonized composite is then impregnated several times with pitch by covering the composite with hot pitch under pressure. The composites are given a heat treatment between each impregnation step to crack up the infiltrated carbon and allow additional pitch to enter the microstructure during the next impregnation cycle. The impregnated composites are then given a final heat treatment in the range 2500° to 3000° C. to fully graphitize the fibers and the matrix carbon. The composites are then infiltrated with pyrolytic carbon by chemical vapor deposition in the range 1000° to 1300° C. at a reduced pressure for approximately 150 hours.

DESCRIPTION OF PREFERRED EMBODIMENT

I have described below the process used by me to produce improved carbon-carbon composites that have high-strength, high-modulus and high thermal and electrical conductivity.

Making The Green Laminates

Carbon fibers derived from mesophase pitch such as those designated as a "P" series from Amoco Performance Products, Inc. or those designated as an "E" series from Du Pont de Nemours & Company which have elastic moduli in the range 25 to 140 Msi are woven into a suitable cloth. The cloth is preferable woven either as a plain weave or as a harness satin weave from 3 to 8. The cloth is then cut into swatches of a suitable size for further processing. One swatch is placed onto the platen of a hot press and sprinkled with a fine pitch powder. The pitch may be a petroleum pitch, a coal tar pitch or a mesophase pitch derived from either of the former. Alternate layers of the cloth swatches are then built up with a suitable pitch sprinkled on each swatch as it is added to the stack in approximately equal increments of weight until the stack has a thickness in the range 0.030" to 0.500". These green laminate composites contain between 4 to 32 plies of cloth swatches.

Pressing The Green Laminates

The green composites are then pressed in the range 70 to 100 psi in a hydraulic press at a temperature about 30° F. above the softening point of the pitch that was used as a binder. The pressure is held for about one (1) hour. The green composites are cooled under pressure for about 30 minutes. Excess pitch is trimmed from each composite after removal from the press.

Carbonizing The Green Laminates

The pressed composites are restrained firmly with graphite plates secured by graphite bolts when petroleum or coal-tar pitches are used. This is done to prevent distortion, puffing or reduction in fiber volume during carbonization. A non-carbonizing "graphfoil" and E glass fabric ply is placed between the panels or disks and the graphite fixture plates to minimize adherence of the panels or disks to the graphite fixtures. The restrained parts are placed in saggers and covered with sand. The saggers are placed into a furnace, a vacuum drawn, and the chamber purged with an inert gas such as argon, helium of nitrogen. The composites are slowly heated to 500° C. in 75 hours to carbonize the pitch binder. The panels are then heated to 900° C. without the graphite fixtures. Fiber volumes of 25 to 55 percent are obtained.

Pitch Impregnation Process

The carbonized composites are then placed in the bottom of a suitable metal container, the dead space in the container filled with graphite blocks and a metal bar placed on top of the composites. An impregnating pitch such as Ashland Oil Company's A-240 pitch is placed in a suitable metal container that had holes punched in the bottom. The can containing the pitch is then placed on top of the parts, the entire assembly placed in an autoclave, the autoclave evacuated and gradually heated to 200° C. to submerge the composites in molten pitch. The metal bar that was placed on top of the composites keeps them from floating on the molten pitch. The autoclave is then pressurized to 15 psi with nitrogen, a vacuum is then drawn and the nitrogen pressure reapplied at 15 psi. This cycle is repeated twice. The autoclave is then cooled under pressure and the composites chipped out of the hardened pitch. The composites are then heat treated to 900° C. to carbonize the impregnated pitch. This pitch impregnation process, including the carbonization at 900° C., is repeated four times.

The impregnated composites are then heated as rapidly as practical within limits of the furnace in an inert atmosphere to a temperature in the range 2500° to 3100° C. and preferable held at the selected temperature for a period of from 0.5 to 2.0 hours. The composites are then cooled in the inert atmosphere to room temperature.

Infiltration With Pyrolytic Carbon

The composites are then placed in a high temperature furnace, a vacuum of from 1 to 150 torr (preferably about 50 torr) is drawn and the composites heated to a temperature in the range 982° to 1149° C. The open pores of the composites are infiltrated by a suitable hydrocarbon gas, preferably methane or propane. The gas is pyrolyzed and pyrolytic carbon is deposited in the pores on the pore walls. Constant infiltration is carried out for approximately 150 hours. The composites may be impregnated once or several times. Impregnation is improved by light machining of the surfaces after each impregnation to unpack surface pores and permit better penetration of the hydrocarbon gas during subsequent infiltrations.

Explanation

It is the heat treatment of the composites to temperatures in the range of 2500° to 3100° C. which graphitizes the mesophase pitch derived fibers and the pitch carbon matrix that imparts high thermal and electrical conductivity to these composites. However, the heat treatment reduces the strength of the composites. The strength is restored by the further impregnation with pyrolytic carbon. The impregnation with pyrolytic carbon also further increases the thermal conductivity of the composites. The high modulus of the composites results from the original high modulus of the mesophase derived carbon fibers.

3D Woven Structures

The above describes the selection of materials and processing of 2D laminate carbon-carbon composites. In addition these materials and processing may be used to fabricate a 3D woven carbon-carbon composite that has high-strength, high-modulus and high thermal and electrical conductivity. The materials and processing are identical to that described above with the following exceptions:
1. The fibers are woven into a suitable 3D or higher dimension preform or as a braided cloth or tube.
2. The preforms are rigidized by infiltration with a hydrocarbon gas that deposits pyrolytic carbon in the pores.

Variations

While the above describes the preferred methods for practicing the present invention the following variations can be useful:
1. When a mesophase pitch is used as the binder instead of regular petroleum or coal tar pitch, the green composites are preferably heated in air at approximately 220° C. for about ten (10) hours to stabilize the pitch against distortion during the carbonization process. In such a process, restraint of the green composites is not required. After chipping the composites out of the hardened pitch, the open porosity could be measured and if less than about 20 percent, the composites are heated to 1650° to 1750° C. to reopen the pores.

Test Results

The following are examples of the preferred embodiment:
1. Where the composite being fabricated with 100 Msi modulus pitch fibers woven into an 8HS cloth and carbonized as described above and is multi-impregnated with pitch, carbonized after each pitch impregnation and subsequently heated in the range 2400° to 3000° C. Properties for this example are shown in Table 1.

TABLE 1

| Properties | |
|---|---|
| a. Density, g/cc | 1.55 to 1.71 |
| b. Thermal Conductivity, W/m.K | |
| In-plane | 178 to 191 |
| Cross-Plane | 38 |
| c. Thermal Expansivity, (alpha × $10^6$ °C.) | |
| In-Plane | 0.50 to 0.70 |
| Cross-Plane | 8.00 to 13.5 |
| d. Electrical Resistivity (Micro-ohm cm) | |
| In-Plane | 280 to 550 |
| Cross-Plane | 1330 to 1850 |
| e. Tensile (In-Plane) | |
| Strength, Ksi | 26 |
| Modulus, Msi | 14 to 22 |
| f. Edge Compression Strength, Ksi | 6.0 to 8.8 |
| g. Cross-Ply Tensile Strength, Psi | 430 |
| h. Interlaminar Shear Strength, Ksi | 0.8 to 1.3 |

2. When the composite being fabricated with 100 Msi modulus fibers woven into an 8HS cloth and carbonized as described above is multi-impregnated with pitch, carbonized after each pitch impregnation, subsequently heat treated in the range 2400° to 3000° C. and finally reimpregnated with pyrolytic carbon by infiltration with a hydrocarbon gas at reduced pressure. Properties for this example are shown in Table 2.

TABLE 2

| Properties | |
|---|---|
| a. Density, g/cc | 1.52 to 1.54 |
| b. Thermal Conductivity, W/m.K | |
| In-plane | 176 to 269 |
| Cross-Plane | 27 to 33 |
| c. Thermal Expansivity, (alpha × $10^6$ °C.) | |
| In-Plane | 0.40 to 0.50 |
| Cross-Plane | 10.0 to 13.0 |
| d. Electrical Resistivity, (Micro-ohm cm) | |
| In-Plane | 240 to 440 |
| e. Tensile (In-Plane) | |
| Strength, Ksi | 19 to 20 |
| Modulus, Msi | 17 to 19 |
| f. Edge Compression Strength, Ksi | 7.9 to 10.8 |
| g. Cross-Ply Tensile Strength, Psi | 360 to 510 |
| h. Interlaminar Shear Strength, Ksi | 1.2 to 1.5 |

3. Same as Example 2 above except the cloth is unbalanced with four 4 fiber tows in the warp direction to one 1 fiber tow in the fill direction. Properties for this example are shown in Table 3.

TABLE 3

| Properties | |
|---|---|
| a. Density, g/cc | 1.62 to 1.78 |
| b. Thermal Conductivity, W/m.K | |
| In-plane | 178 to 105 |
| Cross-Plane | 33 to 35 |
| c. Thermal Expansivity, (alpha × $10^6$ °C.) | |
| In-Plane | — |
| Cross-Plane | — |
| d. Electrical Resistivity, (Micro-ohm cm) | |
| In-Plane | 170 to 330 |
| e. Tensile (In-Plane) | |
| Strength, Ksi | 38 to 50 |
| Modulus, Msi | 34 to 40 |
| f. Edge Compression Strength, Ksi | 15.2 to 16.9 |

TABLE 3-continued

| Properties | |
|---|---|
| g. Cross-Ply Tensile Strength, Psi | 540 to 625 |
| h. Interlaminar Shear Strength, Ksi | 2.0 to 2.8 |

4. Same as Example 2 above except the cloth is woven with 25 Msi modulus pitch fibers. Properties for this example are shown in Table 4.

TABLE 4

| Properties | |
|---|---|
| a. Density, g/cc | 1.67 to 1.71 |
| b. Thermal Conductivity, W/m.K | |
|    In-plane | 151 to 191 |
|    Cross-Plane | 38 |
| c. Thermal Expansivity, (alpha × $10^6$ °C.) | |
|    In-Plane | — |
|    Cross-Plane | — |
| d. Electrical Resistivity, (Micro-ohm cm) | |
|    In-Plane | 150 to 200 |
| e. Tensile (In-Plane) | |
|    Strength, Ksi | 25 to 28 |
|    Modulus, Msi | 15 to 16 |
| f. Edge Compression Strength, Ksi | 10.0 to 11.9 |
| g. Cross-Plane Tensile Strength, Psi | 420 to 470 |
| h. Interlaminar Shear Strength, Ksi | 1.4 to 1.7 |

5. Same as example 1 above except the cloth is woven with 25 Msi modulus pitch fibers and prepegged with 50% phenolic resin and 50% petroleum pitch. Properties for this example are shown in Table 5.

TABLE 5

| Properties | |
|---|---|
| a. Density, g/cc | 1.71 to 1.72 |
| b. Thermal Conductivity | |
|    In-plane | 96 to 153 |
|    Cross-Plane | 21 to 37 |
| c. Thermal Expansivity, (Alpha × $10^6$ °C.) | |
|    In-Plane | — |
|    Cross-Plane | — |
| d. Electrical Resistivity (Micro-ohm cm) | |
|    In-Plane | 260 to 630 |
|    Cross-Plane | — |
| e. Tensile (In-Plane) | |
|    Strength, Ksi | 25 to 35 |
|    Modulus, Msi | 15 |
| f. Edge Compression Strength, Ksi | 9.9 to 10.5 |
| g. Cross-Ply Tensile Strength, Psi | 215 to 270 |
| h. Interlaminar Shear Strength, Ksi | 0.9 |

6. Same as example 1 above except the cloth is woven with 120 Msi modulus pitch fibers into a plain weave pattern and heated to 3000° C. Properties for this example are shown in Table 6.

TABLE 6

| Properties | |
|---|---|
| a. Density, g/cc | 1.61 to 1.68 |
| b. Thermal Conductivity, W/m.K | |
|    In-plane | 172 to 184 |
|    Cross-Plane | 49 to 51 |
| c. Thermal Expansivity, (Alpha × $10^6$ °C.) | |
|    In-Plane | 0.25 to 0.40 |
|    Cross-Plane | 8.85 to 11.2 |
| d. Electrical Resistivity (Micro-ohm cm) | |
|    In-Plane | 120 to 190 |

TABLE 6-continued

| Properties | |
|---|---|
|    Cross-Plane | — |
| e. Tensile (In-Plane) | |
|    Strength, Ksi | — |
|    Modulus, Msi | — |
| f. Edge Compression Strength, Ksi | — |
| g. Cross-Ply Tensile Strength, Psi | — |
| h. Interlaminar Shear Strength, Ksi | 1.2 to 1.8 |

What is claimed is:

1. A method for fabricating a high-strength, high-modulus and high thermal and electrical conducting 2D laminate carbon-carbon composite comprising the steps of:
   a. forming a green laminate composite comprising:
      (1) graphitizible carbon cloth plies and
      (2) fine graphitizible pitch powder; said cloth plies comprising mesophase derived pitch fiber tow with moduli in a range of 25 to 140 Msi.
   b. heating the green laminate composite to a temperature high enough to cause the pitch powder to soften and pressing the composite to form a pressed green laminate composite comprised of graphitizible carbon cloth and pitch matrix.
   c. heating the pressed green laminate composite to at least 500° C. to:
      (1) carbonize the pitch,
      (2) form a carbon matrix and
      (3) shrink and crack the carbon matrix,
   d. impregnating the pressed green composite with additional graphitizible pitch by covering the composite with pitch at a temperature of at least 200° C. and applying pressure of at least 15 psi,
   e. heating the composite to at least 900° C.,
   f. repeating steps d and e at least once,
   g. heating the composite to between 2400° C. to 3100° C. to graphitize the fibers and the matrix carbon in the composite to produce a graphitized composite having cracks and pores, and
   h. impregnating the graphitized composite by infiltrating the cracks and pores of the composite with a hydrocarbon gas at a temperature in the range of 982° C. to 1490° C. and depositing pyrolytic carbon in the pores and cracks.

2. The method as in claim 1 wherein said at least 500° C. in step c is at least 900° C.

3. The method as in claim 2 and further comprising an additional step of heating said composite to about 1750° C. following a performance of step e.

4. The method as in claim 3 and comprising a further step of machining surface of said composite following the step of heating said composite to about 1750° C.

5. The method as in claim 1 wherein the fibers of said fiber cloth are approximately 100 Msi modulus fibers.

6. The method in claim 1 wherein said cloth defining warp and fill directions, is essentially balanced in the warp and fill directions.

7. The method as in claim 1 wherein said cloth is substantially unbalanced in the warp and fill directions.

8. The method as in claim 1 wherein said fine pitch powder is petroleum pitch and comprising the additional step of confining said pressed green composite prior to heating it to at least 500° C.

9. The method as in claim 1 wherein said fine pitch powder is mesophase pitch and further comprising the step of heating said pressed green composite in air at approximately 220° C. for about 10 hours prior to the first carbonization step.

10. The method as in claim 1 wherein said fine pitch powder is coal tar pitch and comprising the additional step of confining said pressed green composite prior to heating it to at least 500° C.

11. A method for fabricating a high-strength, high-modulus and high thermal and electrical conducting 3D carbon-carbon composite comprising the steps of:
   a. forming a 3D green composite comprising:
      (1) a 3D preform comprised of woven graphitizible carbon fiber and
      (2) fine graphitizible pitch powder; said carbon fiber having moduli in the range of 25 to 140 Msi,
   b. heating the rigid 3D green composite to a temperature high enough to cause the pitch powder to soften and pressing the composite to form a pressed 3D green composite comprised of graphitizible carbon fibers and pitch matrix,
   c. heating the pressed 3D green composite to at least 500° C. to;
      (1) carbonize the pitch,
      (2) form a carbon matrix and
      (3) shrink and crack the carbon matrix,
   d. rigidizing the 3D green composite by infiltration with hydrocarbon gas that deposits pyrolytic carbon.
   e. impregnating the pressed green composite with additional graphitizible pitch by covering the composite with pitch at a temperature of at least 200° C. and applying pressure of at least 15 psi,
   f. heating the composite to at least 900° C.,
   g. repeating steps e and f at least once,
   h. heating he composite to between 2400° C. to 3100° C. to graphitize the fibers and the matrix carbon in the composite to produce a graphitized composite having cracks and pores, and
   i. impregnating the graphitized composite by infiltrating the cracks and pores of the composite with a hydrocarbon gas at a temperature in the range of 982° C. to 1490° C. and depositing pyrolytic carbon in the pores and cracks.

12. The method of claim 11 and comprising the additional step of heating the composite to at least 1750° C. following at least one of step f.

13. The method of claim 11 and comprising the additional step of machining surfaces of said composite prior to at least one of step e.

14. A method for fabricating a high-strength, high-modulus and high thermal and electrical conducting multidimensional carbon-carbon composite comprising the steps of:
   a. forming a multidimensional green composite comprising:
      (1) a preform comprised of graphitizible carbon fiber woven in more than three dimensions and
      (2) fine graphitizible pitch powder; said carbon fiber having a moduli in the range of 25 to 140 Msi,
   b. heating the rigid multidimensional green composite to a temperature high enough to cause the pitch powder to soften and pressing the composite to form a pressed green composite comprised of graphitizible carbon fibers and pitch matrix.
   c. heating the pressed multidimensional green composite to at least 500° C. to:
      (1) carbonize the pitch,
      (2) form a carbon matrix and
      (3) shrink and crack the carbon matrix,
   d. rigidizing the multidimensional green composite by infiltration with a hydrocarbon gas that deposits pyrolytic carbon.
   e. impregnating the pressed green composite with additional graphitizible pitch by covering the composite with pitch at a temperature of at least 200° C. and applying pressure at least 15 psi,
   f. heating the composite to at least 900° C.
   g. repeating steps e and f at least once,
   h. heating the composite to between 2400° C. to 3100° C. to graphitize the fibers and the matrix carbon in the composite to produce a graphitized composite having cracks and pores, and
   i. impregnating the graphitized composite by infiltrating the cracks and pores of the composite with a hydrocarbon gas at a temperature in the range of 982° C. to 1490° C. and depositing pyrolytic carbon in the pores and cracks.

15. The method as in claim 14 wherein said fine pitch powder is coal tar pitch and comprising the additional step of confining said pressed green composite prior to heating it to at least 500° C.

* * * * *